(12) United States Patent
Lien et al.

(10) Patent No.: US 12,452,399 B2
(45) Date of Patent: Oct. 21, 2025

(54) DISPLAY DEVICE WITH MOVABLE GRID STRUCTURE

(71) Applicant: STAR ASIA VISION CORPORATION, Hsinchu (TW)

(72) Inventors: Ching-Tien Lien, Hsinchu (TW); Kai-Wen Chen, Hsinchu (TW); Chi-Tseng Chang, Hsinchu (TW); Kuo-Shu Huang, Hsinchu (TW)

(73) Assignee: STAR ASIA VISION CORPORATION, Hsinchu (TW)

( * ) Notice: Subject to any disclaimer, the term of this patent is extended or adjusted under 35 U.S.C. 154(b) by 0 days.

(21) Appl. No.: 18/732,181

(22) Filed: Jun. 3, 2024

(65) Prior Publication Data
US 2025/0150571 A1 May 8, 2025

(30) Foreign Application Priority Data
Nov. 7, 2023 (TW) ................... 112142882

(51) Int. Cl.
*H04N 13/30* (2018.01)
*H04N 13/32* (2018.01)
*H04N 13/354* (2018.01)

(52) U.S. Cl.
CPC .......... *H04N 13/32* (2018.05); *H04N 13/354* (2018.05)

(58) Field of Classification Search
CPC ......... H04N 13/32; H04N 13/354; G09G 3/30
See application file for complete search history.

(56) References Cited

U.S. PATENT DOCUMENTS

| | | | |
|---|---|---|---|
| 2013/0015616 A1* | 1/2013 | Valois | F16F 3/02 267/160 |
| 2013/0329021 A1* | 12/2013 | Fidler | F21V 5/04 348/54 |

FOREIGN PATENT DOCUMENTS

| | | |
|---|---|---|
| CN | 101539689 B | 5/2013 |
| JP | 2005157033 A | 6/2005 |
| KR | 20130013931 | 2/2013 |

* cited by examiner

*Primary Examiner* — Roy P Rabindranath
(74) *Attorney, Agent, or Firm* — MUNCY, GEISSLER, OLDS & LOWE, P.C.

(57) ABSTRACT

The invention relates to a display device which comprises a light source, a grid structure and a photo interrupter. The grid structure is disposed above the light source and can move left and right relative to the light source. When the grid structure does not block the photo interrupter, the light source receives a first signal, and when the grid structure blocks the photo interrupter, the light source receives a second signal.

11 Claims, 7 Drawing Sheets

DISPLAY DEVICE WITH MOVABLE GRID STRUCTURE

CROSS-REFERENCES TO RELATED APPLICATIONS

This application claims the benefit of priority to Taiwanese Patent Application No. 112142882 filed on Nov. 7, 2023, which is hereby incorporated by reference in its entirety.

BACKGROUND OF THE INVENTION

Field of the Invention

The present invention relates to a display device, and in particular to a multi-angle visible display device.

Descriptions of the Related Art

With the rapid development of science and technology, the technology of outdoor display screens has made good progress. It provides a variety of options for outdoor advertising, performance venues, traffic signs, etc. It also provides a better experience for people to obtain information and enjoy entertainments in an outdoor environment. The development of outdoor display screens is particularly dependent on the light emitting diode (LED) advanced technology, which makes outdoor display screens become brighter and clearer. In addition, multi-viewing technology is gradually being applied in outdoor displays. Through more advanced LED and display technologies, outdoor displays have begun to provide a wider viewing angle range so that the display performs more uniform when people view it from different angles.

However, LED is a surface light source, and its light distribution is usually stronger in the middle area and weaker in the two side areas. This non-uniform light distribution will cause the observer to have different image performance of the display screen at different viewing angles and at far-field distance when viewing a display screen using LEDs as its light source. The observer experiences stronger image brightness in the normal direction of the display. On the other hand, the image brightness experienced by an observer when viewing the monitor from the side is relatively dark. In order to overcome the above problems, the industry is in urgent need of an innovative display device to improve the above-mentioned problem of multi-angle imaging differences of conventional display screens.

SUMMARY OF THE INVENTION

The main objective of the present invention is to provide an innovative display device to improve the imaging discrepancies, such as non-uniformity of brightness and coloration, observed in conventional display devices using LEDs as light sources under multi-angle viewing conditions.

To achieve the above objective, the present invention discloses a display device which comprises a light source, a grid structure and a photo interrupter. The grid structure is disposed above the light source and can move left and right relative to the light source. When the grid structure does not block the photo interrupter, the light source receives a first signal, and when the grid structure blocks the photo interrupter, the light source receives a second signal.

In one embodiment of the display device of the present invention, wherein the strength of the second signal is greater than that of the first signal.

In one embodiment of the display device of the present invention, wherein after the light source receives the first signal, the brightness emitted by the light source through the middle area between the grid structure is approximately equal to the brightness emitted by the light source through the two side areas of the grid structure after the light source receives the second signal.

In one embodiment of the display device of the present invention, the display device further comprises a controller and a driver, wherein when the grid structure does not block the photo interrupter, the controller reads the signal of the photo interrupter and controls the driver to output the first signal to the light source, and when the grid structure blocks the photo interrupter, the controller reads the signal of the photo interrupter and controls the driver to output the second signal to the light source.

In one embodiment of the display device of the present invention, the display device further comprises a circuit board, and the light source comprises a plurality of light-emitting units, wherein each of the light-emitting units is disposed on the circuit board.

In one embodiment of the display device of the present invention, wherein each of the light-emitting units comprises a red light-emitting diode, a green light-emitting diode and a blue light-emitting diode.

In one embodiment of the display device of the present invention, wherein the photo interrupter is disposed on the circuit board so that when the grid structure moves left and right, the photo interrupter will be blocked or not be blocked by the grid structure.

In one embodiment of the display device of the present invention, wherein the grid structure comprises a plurality of grid units, each of the grid units comprises a left grid and a right grid, there is a gap between the left grid and the right grid, when the grid structure does not block the photo interrupter, each of the light-emitting units emits light through the gap between the left grid and the right grid of each of the grid units, and when the grid structure blocks the photo interrupter, each of the light-emitting units emits light through the two side areas of the left grid and the right grid of each of the grid units.

In one embodiment of the display device of the present invention, wherein a grid width between the left grid and the right grid in each of the grid units is approximately 0.5 to 20 times a characteristic size of the light-emitting unit, and the characteristic size is an effective diameter or an effective side length of the light-emitting unit.

In one embodiment of the display device of the present invention, wherein a distance between each of the grid units and the circuit board is approximately 1 to 20 times of a grid width between the left grid and the right grid in each of grid units.

In one embodiment of the display device of the present invention, wherein when a lateral width of the display device is not less than 5 times a distance between the display device and an observer, outputting the first signal different from the second signal respectively corresponding to the left eye and the right eye of the observer, the observer can substantially obtain a three-dimensional display.

After referring to the drawings and the embodiments as described in the following, those the ordinary skilled in this art can understand other objectives of the present invention, as well as the technical means and embodiments of the present invention.

DETAILED DESCRIPTION OF THE PREFERRED EMBODIMENT

In the following description, the present invention will be explained with reference to various embodiments thereof. These embodiments of the present invention are not intended to limit the present invention to any specific environment, application or particular method for implementations described in these embodiments. Therefore, the description of these embodiments is for illustrative purposes only and is not intended to limit the present invention. It shall be appreciated that, in the following embodiments and the attached drawings, a part of elements not directly related to the present invention may be omitted from the illustration, and dimensional proportions among individual elements and the numbers of each element in the accompanying drawings are provided only for ease of understanding but not to limit the present invention.

Figure 1:
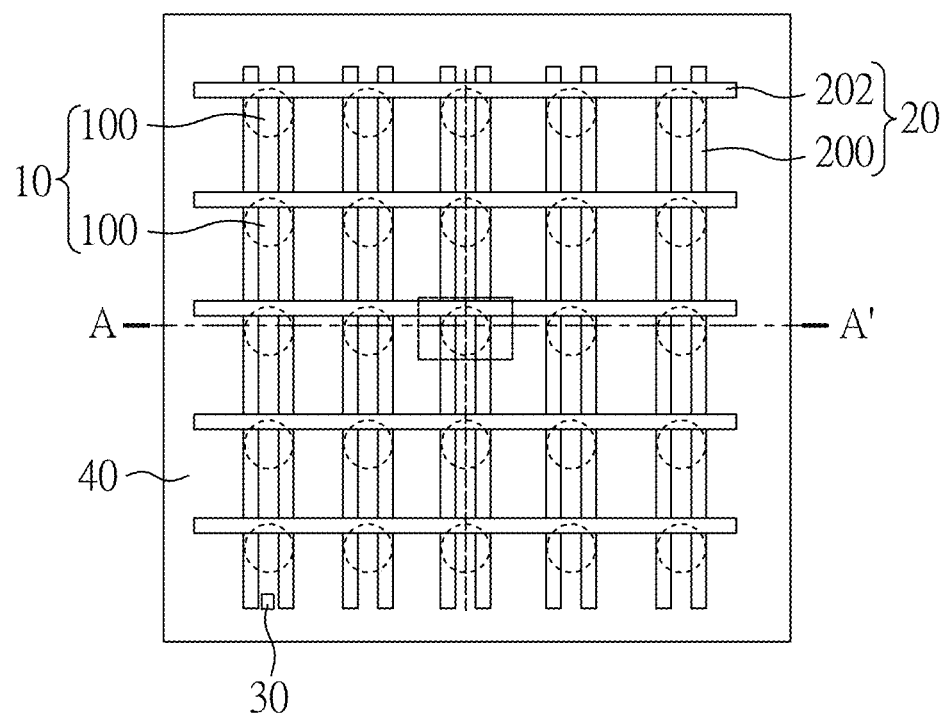
FIG. 1 depicts a schematic diagram of the structure of the display device in one embodiment of the present invention when the photo interrupter is not blocked.

Please refer to FIG. 1, which illustrates a schematic diagram of the structure of a display device in an embodiment of the present invention. As shown in the diagram, the display device 1 in this embodiment includes a light source 10, a grid structure 20, a photo interrupter 30, and a circuit board 40. The light source 10 comprises a plurality of light-emitting units 100 arranged in a matrix pattern and spaced apart, installed on the circuit board 40. The grid structure 20 is disposed above the light source 10 and can move left and right relative to the light source 10 in a reciprocating manner. In addition, the photo interrupter 30 is disposed on the circuit board 40. When the grid structure 20 moves left and right relative to the light source 10, the photo interrupter 30 is sometimes blocked by the grid structure 20 and sometimes not. The photo interrupter 30 sends out different signals corresponding to different blocking states, to adjust the output of the light source 10. Thereby, the problem of non-uniform brightness of conventional display screens observed from different viewing angles by observers will be improved.

Figure 2:
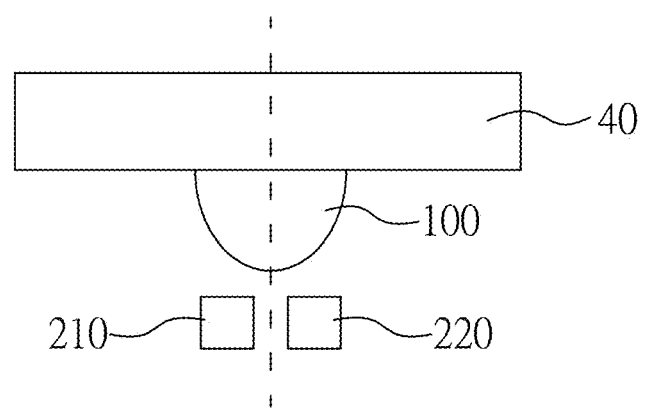
FIG. 2 shows a schematic diagram of the cross-sectional view along line A-A' within the dashed square region of FIG. 1.

In preferred embodiments, each light-emitting unit 100 may include a red light-emitting diode, a green light-emitting diode, and a blue light-emitting diode for various color display purposes, but not limited thereto. For simplicity, FIG. 1 does not specifically depict light-emitting diodes with different colors in each light-emitting unit, while represents each light-emitting unit 100 with dashed circles, and represents the light-emitting units 100 disposed below the grid structure 20 with dashed circle outlines. Please refer to both FIG. 1 and FIG. 2. FIG. 2 is a schematic diagram of a cross-sectional view along line A-A' within the dashed square region shown in FIG. 1, which simplifies the spatial relationship among the light source, the grid structure, and the circuit board in the display device of the present invention. Specifically, as shown in FIG. 2, the grid structure 20 of the present invention includes a plurality of grid units 200 and a plurality of transverse grids 202. Each grid unit 200 comprises a left grid 210 and a right grid 220, with a gap between the left grid 210 and the right grid 220. Additionally, each grid unit 200 is fixed by several transverse grids 202 so that the entire grid structure 20 is capable to move left and right relative to the light source 10 as a whole structure. The transverse grids 202 can also block the light emitted upward by each light-emitting unit 100 for preventing light pollution to the sky when the display device 1 is installed outdoors. More specifically, each grid unit 200 is disposed above the circuit board 40 and spaced apart from the circuit board 40 by a certain distance so that the light-emitting units 100 are disposed between the grid units 200 and the circuit board 40. As illustrated in FIG. 2, a set of left grid 210 and right grid 220 of one grid unit 200 is disposed above each light-emitting unit 100 on the circuit board 40. When the left and right grids 210 and 220 move left and right relative to the light-emitting units 100, the light-emitting units 100 sometimes emit light only from the gap between the left and right grids 210 and 220, and sometimes emit light only from the side areas of the left and right grids 210 and 220. In one preferred embodiment, the distance between each grid unit 200 and the circuit board 40 is approximately 1 to 20 times the grid width of the left grid 210 and the right grid 220, and the grid width of the left and right grids is approximately 0.5 to 20 times a characteristic size of the light-emitting unit, where the characteristic size refers to the effective diameter or effective side length of the light-emitting unit.

Figure 3:
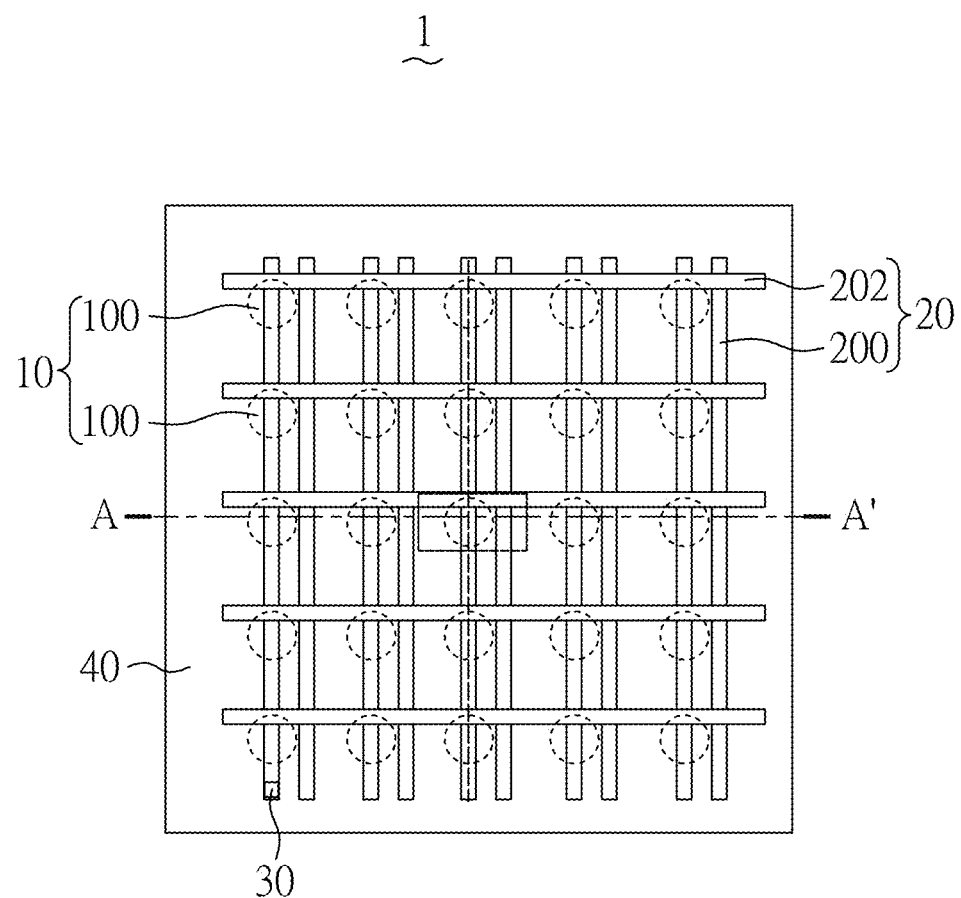
FIG. 3 illustrates a schematic diagram of the structure of the display device in one embodiment of the present invention when the photo interrupter is blocked.
Figure 4:
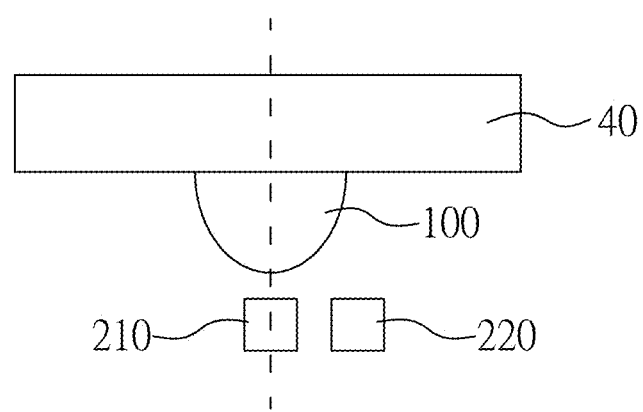
FIG. 4 presents a schematic diagram of the cross-sectional view along line A-A' within the dashed square region of FIG. 3.

It is noted that the number of light-emitting units and grid units shown in the diagrams is for illustration purposes only and is not intended to limit the present invention. Please refer to FIG. 1, FIG. 2, FIG. 3, and FIG. 4 together. FIG. 1 and FIG. 2 illustrate the spatial relationship between the light-emitting units 100 and the left grid 210 and right grid 220 when the photo interrupter 30 is not blocked by any of the grid units 200 in the grid structure 20. On the other hand, FIG. 3 and FIG. 4 illustrate the spatial relationship between the light-emitting units 100 and the left grid 210 and right grid 220 when the photo interrupter 30 is blocked by one of the sets of grid units 200 in the grid structure 20. Similar to FIG. 2, FIG. 4 is a schematic diagram of a cross-sectional view along line A-A' within the dashed square region in FIG. 3 when the photo interrupter 30 is blocked.

Specifically, as shown in FIG. 1 and FIG. 2, when any set of grid units 200 in the grid structure does not block the photo interrupter 30, the photo interrupter sends a voltage signal to a controller (not shown) within the display device. When the controller reads the voltage signal indicating that the photo interrupter is not blocked, it outputs a signal to a driver (not shown) to control the driver to output a first signal, which is received by the light-emitting units 100 of the light source 10. At this point, the spatial relationship between the light-emitting units 100 and the grid units 200 is as shown in FIG. 1 and FIG. 2. The normal direction of the center of the light-emitting unit 100 aligns precisely with the gap between the left grid 210 and the right grid 220, causing most of the light emitted in the normal direction of the light-emitting unit 100 to pass through the gap between the left grid 210 and the right grid 220, while the light emitted from the side of the light-emitting unit 100 is mostly blocked by the grid units.

On the other hand, as shown in FIG. 3 and FIG. 4, when one set of grid units 200 in the grid structure blocks the photo interrupter 30, the voltage signal read by the controller from the photo interrupter will significantly decrease, essentially dropping to zero. At this point, the controller can determine that the photo interrupter has been blocked. Then, it outputs another signal to the driver, instructing the driver to output a second signal, which is received by the light-emitting units 100 of the light source 10. The spatial relationship between the light-emitting units 100 and the grid units 200 at this time is as shown in FIG. 3 and FIG. 4. The normal direction of the center of the light-emitting unit 100 is precisely blocked by one of the left grid 210 and the right grid 220. Most of the light emitted in the normal direction of the light-emitting unit 100 is blocked, while the light emitted from the sides of the light-emitting unit 100 mostly passes outward from the two side areas of the left grid 210 and the right grid 220.

One of the features of the present invention is the ability to dynamically adjust the first and second signals received by the light source, aiming to solve the previously mentioned issue of non-uniform brightness and coloration in multi-angle optical observation caused by using LEDs as light sources in display devices. Specifically, please refer to FIG. 5, where the vertical axis of the signal A represents voltage intensity, and the horizontal axis represents time. The waveform of the signal A represents different voltage signals sent by the photo interrupter depending on its blocked or unblocked state. As mentioned earlier, when the photo interrupter is blocked by the grid structure, the voltage signal sent to the controller by the photo interrupter approaches zero. Conversely, when the photo interrupter is not blocked by the grid structure, the photo interrupter sends a voltage signal with a unit to the controller. As the grid structure moves back and forth, the photo interrupter will send a square wave signal to the controller as shown in the signal A.

Figure 5:
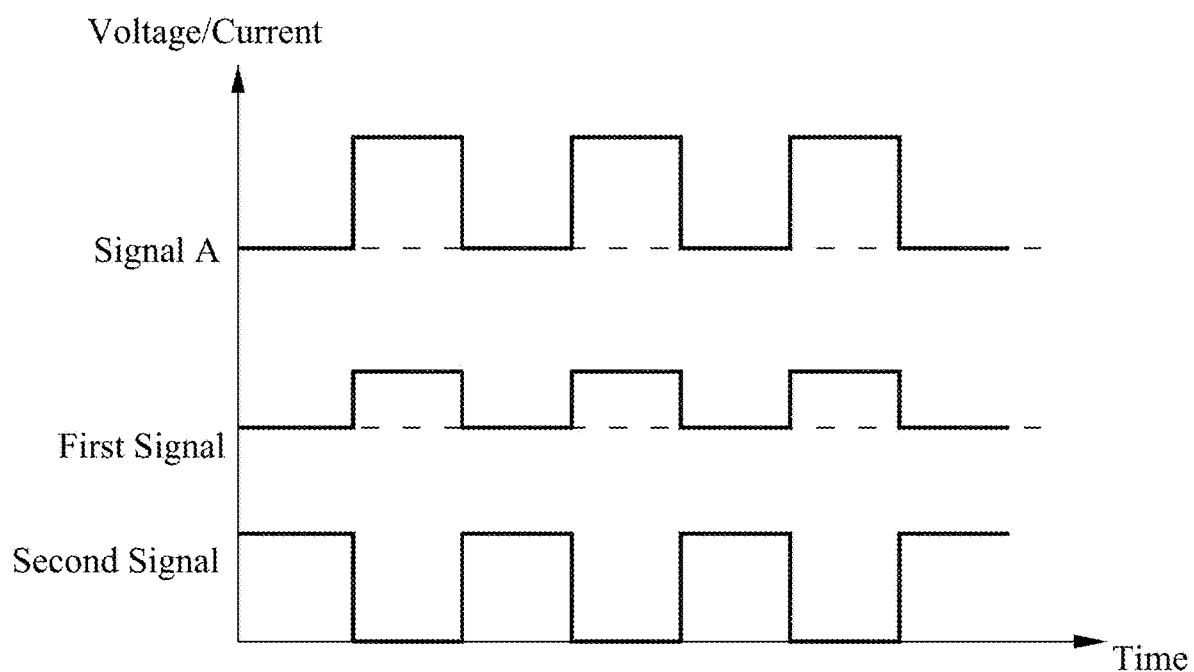
FIG. 5 illustrates the waveform schematic of the signal A from the photo interrupter, along with the first and second signals outputted to the light source in one embodiment of the present invention.
Figure 6A:
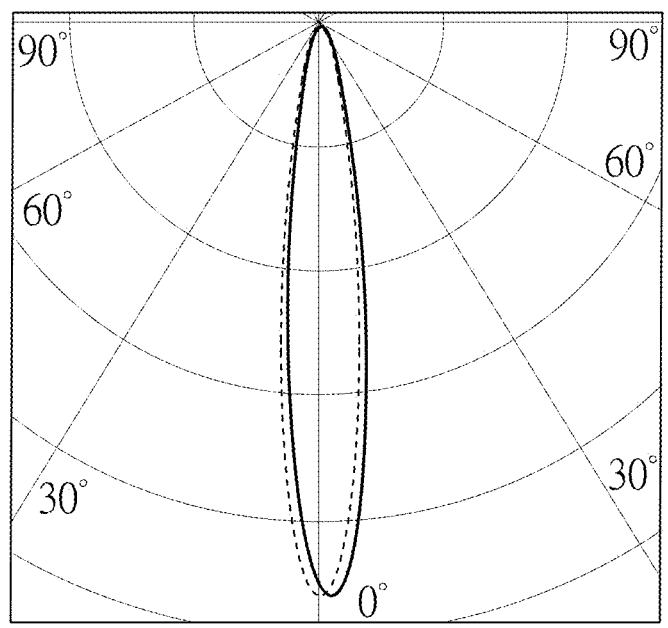
FIG. 6A illustrates a schematic diagram of the light distribution curve of each light emitting unit in the display device after receiving the first signal in one embodiment of the present invention.

When the controller receives the signal A sent by the photo interrupter, it can determine whether the photo interrupter is blocked or not. Specifically, when the controller receives the signal A is a voltage signal with a non-zero unit, it can determine that the photo interrupter is not blocked by the grid structure, and instructs the driver to output the first signal to the light source. The waveform of this first signal is shown in FIG. 5, where the vertical axis represents current intensity and the horizontal axis represents time. The waveform of the first signal is in phase with the signal A, appearing as a square wave. At this point, the spatial relationship between the grid structure and the light source will be as shown in FIG. 1 and FIG. 2, where the light-emitting units 100 emit light outward after receiving the first signal, with most of the light emitted outward through the gap between the left grid 210 and the right grid 220. The photometric curve measured is depicted in FIG. 6A, showing the strongest intensity in the middle area, which can be observed by an observer at the frontal viewing angle.

Figure 6B:
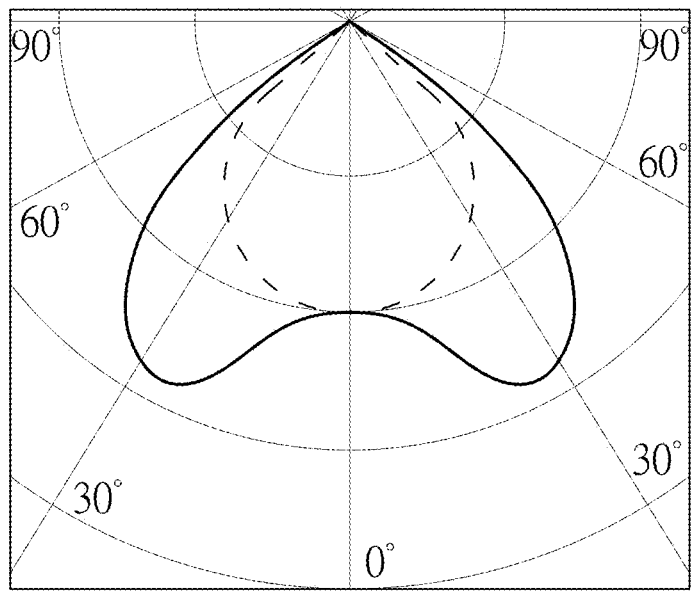
FIG. 6B illustrates a schematic diagram of the light distribution curve of each light emitting unit in the display device after receiving the second signal in one embodiment of the present invention.

On the other hand, when the controller receives the signal A is a voltage signal approaching zero, it can determine that the photo interrupter is blocked by the grid structure. In this case, the controller instructs the driver to output the second signal to the light source. The waveform of this second signal is shown in FIG. 5, where the vertical axis represents current intensity and the horizontal axis represents time. The waveform of the second signal is in phase opposite to the signal A and the first signal, appearing as an inverted square wave. In particular, to solve the issue of non-uniform brightness and coloration experienced by conventional display devices at different viewing angles, the amplitude of the second signal is greater than that of the first signal. Ideally, the amplitude of the second signal is about twice that of the first signal. This is because the spatial relationship between the grid structure and the light source will be as shown in FIG. 3 and FIG. 4. Specifically, the central region of the light-emitting unit 100 will be blocked by either the left grid 210 or the right grid 220, and the light emitted by the light-emitting unit 100 can only be emitted from the side areas blocked by either the left grid 210 or the right grid 220. Considering the weaker emission intensity of LEDs from their sides, the amplitude of the second signal is increased to be twice that of the first signal, ensuring that when an observer is at a side viewing angle position as shown in FIG. 3 and FIG. 4, the light emitted by the light-emitting unit 100 is strengthened at the sides after receiving the second signal, as shown in FIG. 6B. At this point, most of the light emitted by the light-emitting unit 100 is emitted from the side areas blocked by either the left grid 210 or the right grid 220. Due to the amplification of the second signal, the brightness and coloration perceived by the observer at a side viewing angle position can be effectively enhanced, making it substantially consistent with the results observed at the frontal viewing angle position. In summary, when each light-emitting unit receives the first signal, the brightness emitted through the central region of the grid structure is approximately equal to the brightness emitted through the side areas of the grid structure when each light-emitting unit receives the second signal. This resolves the issue of non-uniform brightness and coloration perceived by observers at different viewing angles. The brightness and the coloration correction perceived by observers in far-field optics will be enhanced accordingly.

Figure 7:
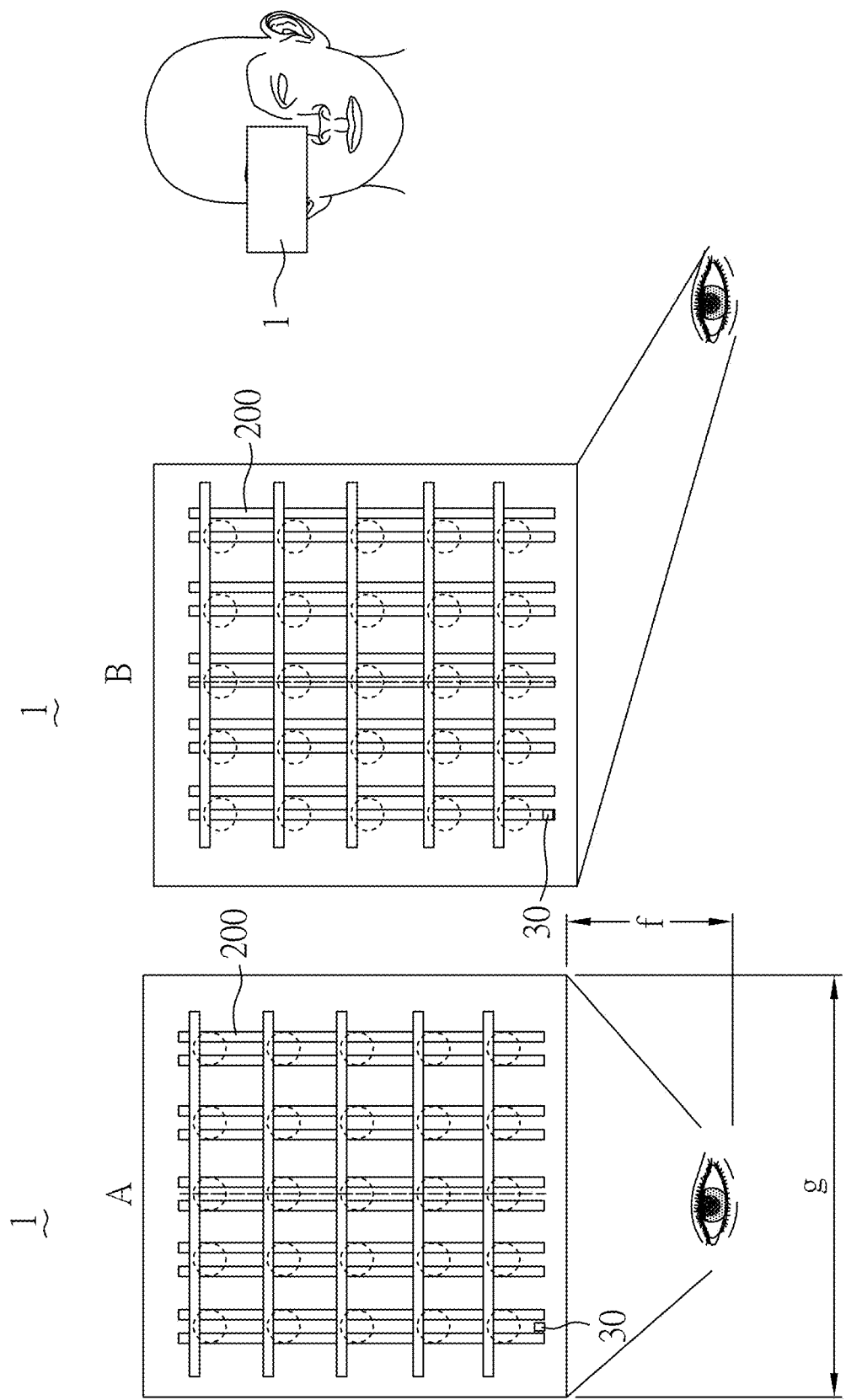
FIG. 7 illustrates a schematic diagram of the display device presenting a three-dimensional display in one embodiment of the present invention.

As mentioned earlier, because the display device of the present invention can dynamically adjust the first and second signals to adjust or correct the brightness and coloration in far-field optics. More specifically, the display device of the present invention can output different signals for both the first and second signals corresponding to the left and right eyes of the observer so that the observer to perceive a three-dimensional display effect in near-field optics. Specifically, as shown in FIG. 7, when applying the display device 1 of the present invention to a three dimensional display, the volume size of the display device needs to substantially cover one eye of the observer, and the lateral width (g) of the display device needs to be substantially not less than 5 times the distance (f) between the display device and the observer. Similarly to the aforementioned, when any set of grid units 200 in the grid structure does not block the photo interrupter 30, the photo interrupter sends out a voltage signal instructing the driver to output the first signal, causing the display device to present image A to be received by the first eye of the observer. On the other hand, when one set of grid units 200 in the grid structure blocks the photo interrupter 30, the controller instructs the driver to output the second signal, causing the display device to present image B to be received by the second eye of the observer. By controlling the first signal different from the second signal, the observer can perceive a three-dimensional display effect in near-field optics.

In summary, to solve the issue of non-uniform brightness and coloration in conventional display devices, this invention employs a shading method to differentiate between signals emitted from the normal and side directions of the light source. Through the continuous movement of a grid structure, different output signals can be controlled so that the signals from the front and sides of the display device to be separated respectively. This enables observers to experience uniform brightness and coloration even in multi-angle viewing scenarios in far-field optics. Thus, the display quality can be enhanced.

The above embodiments are used only to illustrate the implementations of the present invention and to explain the technical features of the present invention, and are not used to limit the scope of the present invention. Any modifications or equivalent arrangements that can be easily accomplished by people skilled in the art are considered to fall within the scope of the present invention, and the scope of the present invention should be limited by the claims of the patent application.

What is claimed is:

1. A display device, comprising:
   a light source;
   a grid structure, disposed above the light source and capable to move left and right relative to the light source; and
   a photo interrupter;
   wherein when the grid structure does not block the photo interrupter, the light source receives a first signal, and when the grid structure blocks the photo interrupter, the light source receives a second signal.

2. The display device of claim 1, wherein the strength of the second signal is greater than that of the first signal.

3. The display device of claim 2, wherein after the light source receives the first signal, the brightness emitted by the light source through a middle area between the grid structure is approximately equal to the brightness emitted by the light source through two side areas of the grid structure after the light source receives the second signal.

4. The display device of claim 1, further comprising a controller and a driver, wherein
   when the grid structure does not block the photo interrupter, the controller reads the signal of the photo interrupter and controls the driver to output the first signal to the light source, and
   when the grid structure blocks the photo interrupter, the controller reads the signal of the photo interrupter and controls the driver to output the second signal to the light source.

5. The display device of claim 1, further comprising a circuit board, and the light source comprises a plurality of light-emitting units, wherein each of the light-emitting units is disposed on the circuit board.

6. The display device of claim 5, wherein each of the light-emitting units comprises a red light-emitting diode, a green light-emitting diode and a blue light-emitting diode.

7. The display device of claim 5, wherein the photo interrupter is disposed on the circuit board so that when the grid structure moves left and right, the photo interrupter is blocked or is not blocked by the grid structure.

8. The display device of claim 5, wherein the grid structure comprises a plurality of grid units, each of the grid units comprises a left grid and a right grid, there is a gap between the left grid and the right grid,
   wherein when the grid structure does not block the photo interrupter, each of the light-emitting units emits light through the gap between the left grid and the right grid of each of the grid units, and
   when the grid structure blocks the photo interrupter, each of the light-emitting units emits light through the two side areas of the left grid and the right grid of each of the grid units.

9. The display device of claim 8, wherein a grid width between the left grid and the right grid in each of the grid units is approximately 0.5 to 20 times a characteristic size of the light-emitting unit, and the characteristic size is an effective diameter or an effective side length of the light-emitting unit.

10. The display device of claim 8, wherein a distance between each of the grid units and the circuit board is approximately 1 to 20 times of a grid width between the left grid and the right grid in each of grid units.

11. The display device of claim 1, wherein when a lateral width of the display device is not less than 5 times a distance between the display device and an observer, outputting the first signal different from the second signal respectively corresponding to the left eye and the right eye of the observer, the observer can substantially obtain a three-dimensional display.

* * * * *